United States Patent
Yamamoto et al.

(10) Patent No.: US 6,891,334 B2
(45) Date of Patent: May 10, 2005

(54) LIGHT SOURCE DEVICE AND LIQUID CRYSTAL DISPLAY EMPLOYING THE SAME

(75) Inventors: Norikazu Yamamoto, Yawata (JP); Teruaki Shigeta, Neyagawa (JP); Nobuhiro Shimizu, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 87 days.

(21) Appl. No.: 10/247,132

(22) Filed: Sep. 18, 2002

(65) Prior Publication Data

US 2003/0052602 A1 Mar. 20, 2003

(30) Foreign Application Priority Data

Sep. 19, 2001 (JP) ........................................ 2001-285417

(51) Int. Cl.⁷ .............................................. G09G 3/10
(52) U.S. Cl. .................... 315/169.1; 313/484; 313/631; 313/637; 313/306; 349/158
(58) Field of Search ...................... 315/169.1; 313/484, 313/581–582, 631, 637, 306–307; 349/158, 56; 362/559, 561

(56) References Cited

U.S. PATENT DOCUMENTS

| | | | |
|---|---|---|---|
| 3,927,342 A * | 12/1975 | Bode et al. ................ | 313/586 |
| 4,013,912 A | 3/1977 | Hinson ........................ | 313/642 |
| 4,038,577 A * | 7/1977 | Bode et al. ................ | 313/586 |
| 4,387,322 A | 6/1983 | Nixon ........................ | 313/497 |
| 4,645,979 A | 2/1987 | Chow ..................... | 315/169.1 |
| 4,899,090 A | 2/1990 | Yoshiike et al. ............ | 315/335 |
| 5,013,959 A | 5/1991 | Kogelschatz ................ | 313/36 |
| 5,117,160 A | 5/1992 | Konda et al. ............... | 315/326 |
| 5,343,114 A | 8/1994 | Beneking et al. ........... | 313/485 |
| 5,514,934 A | 5/1996 | Matsumoto et al. ........ | 313/607 |
| 5,604,410 A | 2/1997 | Vollkommer et al. ....... | 315/246 |
| 5,828,180 A * | 10/1998 | Shinada et al. ............. | 315/160 |
| 6,034,476 A | 3/2000 | Tamura ...................... | 313/607 |
| 6,255,782 B1 | 7/2001 | Kuroda et al. ........... | 315/169.1 |
| 6,331,064 B1 | 12/2001 | Nishiyama et al. ......... | 362/260 |
| 6,590,319 B2 * | 7/2003 | Moon ......................... | 313/292 |

FOREIGN PATENT DOCUMENTS

| | | |
|---|---|---|
| EP | 1 146 544 | 10/2001 |
| JP | 1-143135 | 6/1989 |
| JP | 4-280059 | 10/1992 |
| JP | 5-29085 | 2/1993 |
| JP | 6-181050 | 6/1994 |
| JP | 9-161726 | 6/1997 |
| JP | 10-112290 | 4/1998 |
| JP | 10-284008 | 10/1998 |
| JP | 11-86797 | 3/1999 |
| JP | 2000-259088 | 9/2000 |
| JP | 2000-353494 | 12/2000 |
| JP | 2001-143662 | 5/2001 |
| JP | 2001-237586 | 8/2001 |
| JP | 2001-243921 | 9/2001 |
| JP | 2001-243922 | 9/2001 |
| JP | 1 152 454 | 11/2001 |
| JP | 2001-325919 | 11/2001 |
| JP | 2002-42737 | 2/2002 |

* cited by examiner

*Primary Examiner*—Thuy Vinh Tran
(74) *Attorney, Agent, or Firm*—Merchant & Gould P.C.

(57) ABSTRACT

A light source device includes a substrate, a plurality of discharge tubes arranged on one principal surface of the substrate, a driving circuit mounted on the other principal surface of the substrate that is opposite to the foregoing principal surface, a discharge medium sealed in the discharge tubes, and first and second electrodes for exciting the discharge medium. The foregoing discharge medium does not contain mercury. Thus, the light source device can be formed smaller in size and thinner in thickness, and a liquid crystal display device employing the same can be provided.

14 Claims, 13 Drawing Sheets

LIGHT SOURCE DEVICE AND LIQUID CRYSTAL DISPLAY EMPLOYING THE SAME

BACKGROUND OF THE INVENTION

1. Field of the Invention

The present invention relates generally to a light source device and a liquid crystal display employing the same.

2. Related Background Art

A liquid crystal display used in a car navigator or the like includes a backlight as a light source. The backlight includes a discharge tube, in which a discharge medium is sealed, and electrodes provided inside or outside the discharge tube. A voltage is applied to the electrodes from a driving circuit. To block influences of noises generated by the driving circuit, the driving circuit is disposed distantly from the backlight.

Recently, demands have increased for liquid crystal displays smaller in size and thinner in thickness. However, it has been difficult to sufficiently reduce the size of a conventional liquid crystal display in which a driving circuit is arranged distantly from a backlight. On the other hand, in the case where a driving circuit is provided closer to a backlight, noises generated by the driving circuit affect the discharge in some cases.

SUMMARY OF THE INVENTION

Therefore, with the foregoing in mind, it is an object of the present invention to provide a light source device that can be formed smaller in size and thinner in thickness.

To achieve the foregoing object, a light source device of the present invention includes a substrate having a first principal surface and a second principal surface that are on opposite sides of the substrate, a plurality of discharge tubes arranged on the first principal surface of the substrate, a driving circuit mounted on the second principal surface of the substrate, a discharge medium sealed in the discharge tubes, and first and second electrodes for exciting the discharge medium.

In the foregoing light source device, the discharge medium that does not contain mercury can be used.

In the foregoing light source device, the substrate may include a metal layer provided on the first principal surface side, and an insulating layer provided on the second principal surface side.

In the foregoing light source device, a plurality of grooves may be formed on the first principal surface side of the substrate, and the discharge tubes may be arranged in the grooves.

In the foregoing light source device, the first electrode may be arranged inside each of the discharge tubes, and the second electrode may be formed on the substrate.

In the foregoing light source device, the plurality of discharge tubes may be arranged so that tube axes thereof are arranged in parallel, the second electrode may include a plurality of linear electrodes that are arranged in stripes, and the linear electrodes may be arranged so as to be perpendicular to the tube axes of the discharge tubes.

In the foregoing light source device, a through hole may be formed in the substrate, and at least one electrode selected from the first and second electrodes is connected electrically with the driving circuit via a wire passing through the through hole.

In the foregoing light source device, the discharge medium may contain xenon gas.

In the foregoing light source device, the discharge tubes may comprise a plurality of first discharge tubes, a plurality of second discharge tubes, and a plurality of third discharge tubes, the first, second, and third discharge tubes may be arranged in the stated order repetitively, and the first, second, and third discharge tubes may emit lights with wavelengths different from one another, respectively.

Furthermore, a liquid crystal display of the present invention includes the above-described light source device of the present invention, and a liquid crystal panel that transmits light emitted from the light source device.

DETAILED DESCRIPTION OF THE INVENTION

Figure 1:
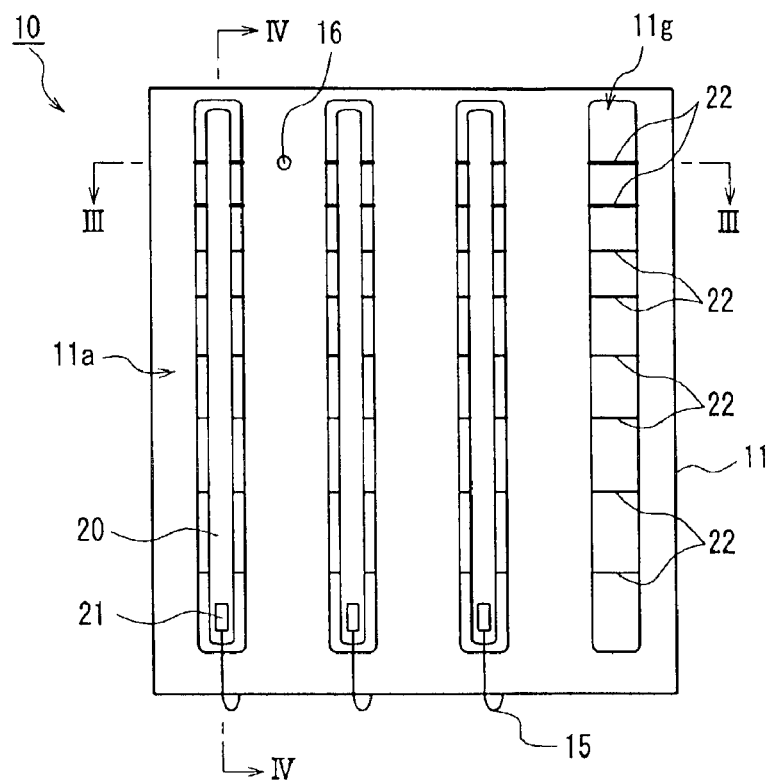
FIG. 1 is a plan view schematically illustrating an example of a configuration of a light source device of the present invention.

The following will describe embodiments of the present invention while referring to the drawings. It should be noted that in the following description, the same members are designated by the same reference numerals and duplicate descriptions of the same are omitted in some cases.

Embodiment 1

Figure 2:
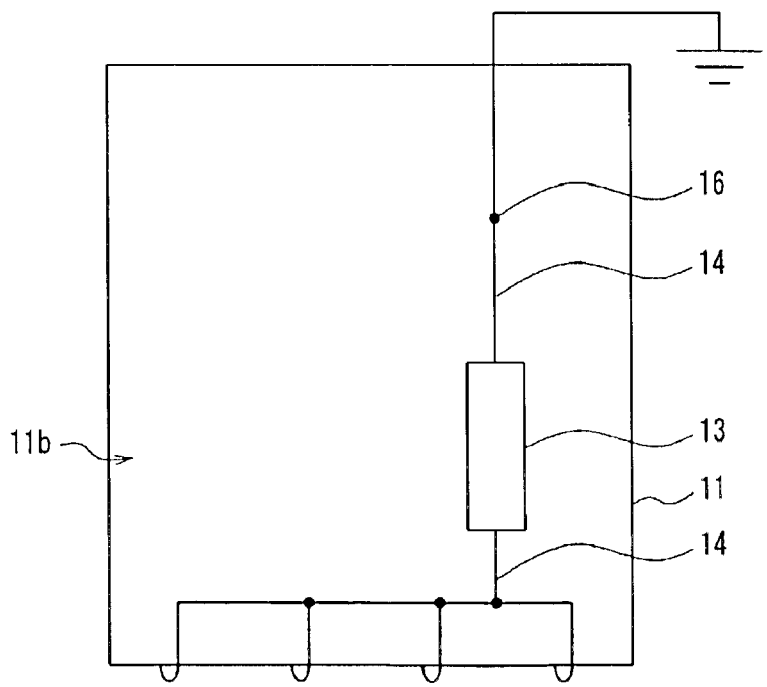
FIG. 2 is a plan view of a back side of the light source device shown in FIG. 1, which schematically illustrates the configuration thereof.
Figure 3:
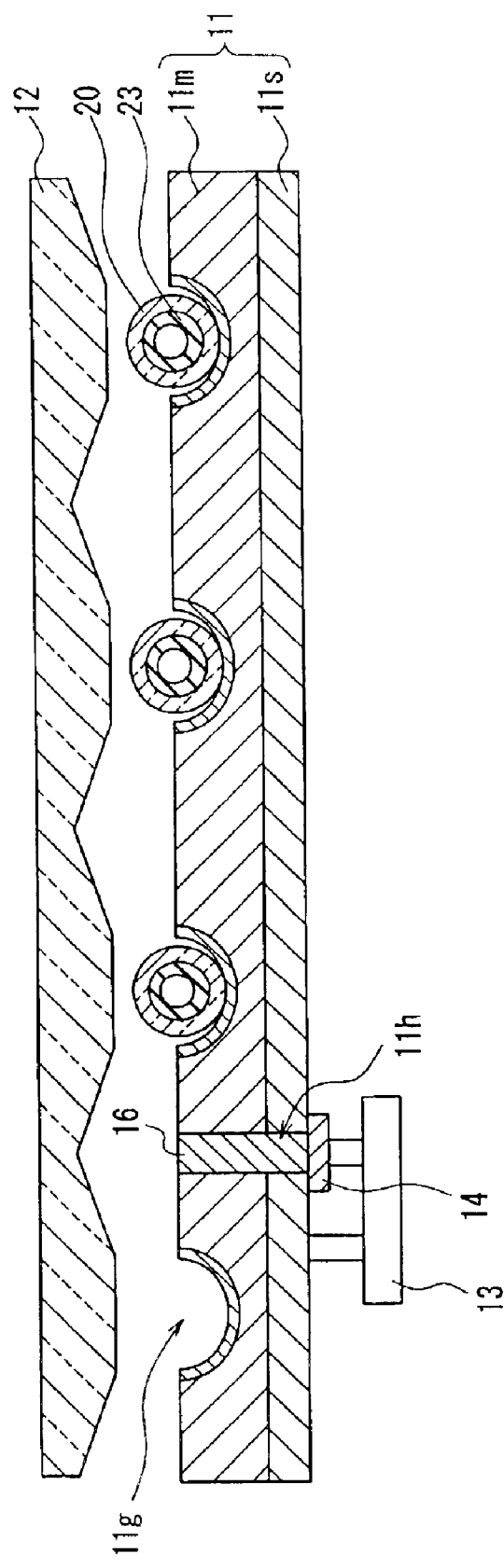
FIG. 3 is a cross-sectional view of the light source device taken along a line III—III in FIG. 1.
Figure 4:
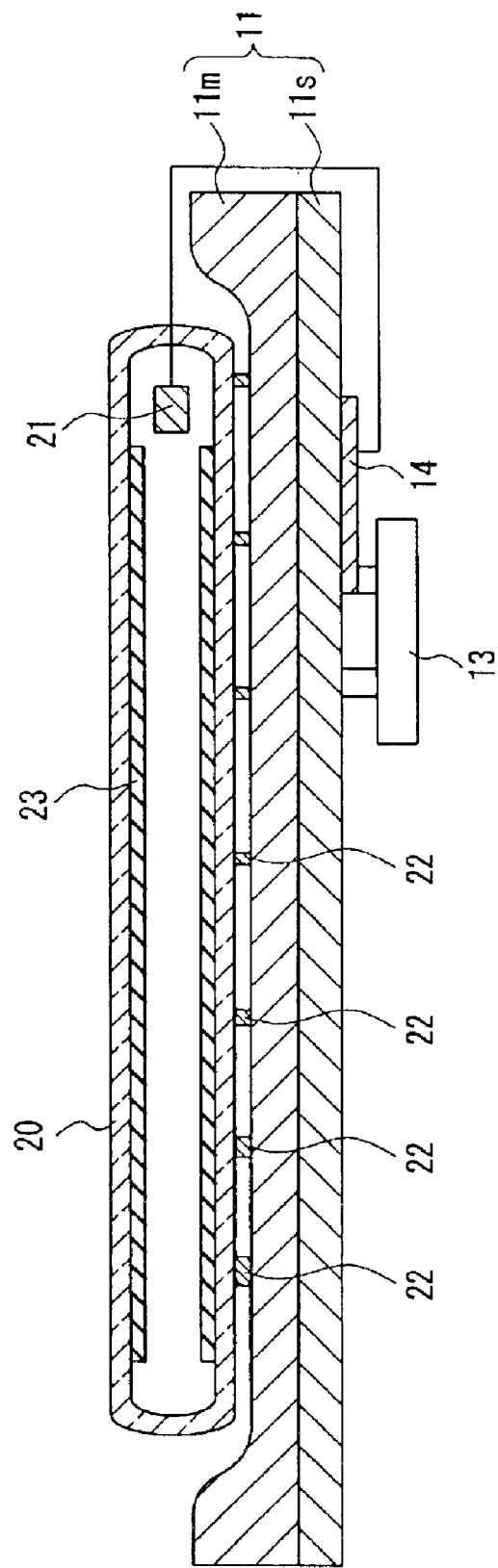
FIG. 4 is a cross-sectional view of the same taken along a line IV—IV in FIG. 1.

In Embodiment 1, an example of a light source of the present invention is described. FIG. 1 is a plan view schematically illustrating a configuration of a light source device 10 of Embodiment 1. FIG. 2 is a plan view of a back side of the light source device 10, which schematically illustrates the configuration thereof. FIG. 3 is a cross-sectional view of the light source device 10 taken along a line III—III in FIG. 1, and FIG. 4 is a cross-sectional view of the same taken along a line IV—IV in FIG. 1. In FIGS. 1 and 3, the illustration of one discharge tube is omitted. Besides, FIG. 3 illustrates a cross section of the light source device 10 in the case where it includes a diffusing plate.

The light source device 10 includes a substrate 11, a diffusing plate 12, a driving circuit 13, a plurality of discharge tubes 20, first electrodes 21, and second electrodes 22. The diffusing plate 12 may be omitted (this also applies to Embodiments described later).

The substrate 11 functions as a circuit board and a reflecting plate. The substrate 11 includes a metal layer and an insulating layer. The metal layer preferably is formed so as to extend substantially to an entire area of the substrate 11. A laminate obtained by laminating a metal layer and an insulating layer, for instance, can be used as the substrate 11. For instance, a composite substrate composed of an aluminum layer and a glass epoxy layer can be used. In FIG. 1, a substrate 11 is shown that is composed of a metal layer 11$m$ and an insulating layer 11$s$. The metal layer can be formed by processing a metal plate made of a metal such as aluminum or copper. As an insulator for forming an insulating layer, an epoxy resin or a glass-epoxy mixture resin can be used, for example. A circuit or a wiring pattern is formed directly on the insulating layer, whereby the light source device can be formed further smaller in size and can be manufactured at a lower cost. Furthermore, a layer made of an insulator such as rubber may be interposed between the metal layer and the insulating layer, whereby the light source device has improved withstand voltage characteristics and improved safety. It should be noted that an insulator having a higher thermal conductivity is preferable.

The metal layer 11$m$ of the substrate 11 prevents noises generated by the driving circuit 13 from reaching the discharge tubes 20. Besides, the metal layer 11$m$ of the substrate 11 diffuses heat generated by the discharge tubes 20. It should be noted that grooves may be formed by bending the substrate 11, as described in Embodiment 3.

On one principal surface 11$a$ of the substrate 11, a plurality of grooves 11$g$ are formed. In each of the grooves 11$g$, the discharge tube 20 is arranged. The discharge tube 20 can be fixed in the groove 11$g$ using an adhesive, a sticking tape, or the like. The provision of the discharge tubes 20 in the grooves 11$g$ allows the light source device 10 to be formed particularly thinner. The substrate 11 preferably has the metal layer on the principal surface 11$a$ side. The metal layer reflects light emitted by the discharge tubes 20, and causes the light to be incident on the diffusing plate 12. The principal surface 11$a$ may be corrugated by sandblasting or the like. The substrate 11 has an insulating layer on the other principal surface 11$b$ that is opposite to the principal surface 11$a$. On the insulating layer, a wiring pattern 14 is formed, on which the driving circuit 13 is mounted. The driving circuit 13 can be mounted by, for instance, flow soldering or reflow soldering.

The diffusing plate 12 is arranged so as to face the substrate 11 with the discharge tubes 20 interposed therebetween. It is intended to diffuse uniformly the light emitted from the discharge tubes 20. The diffusing plate 12 may be made of glass, a transparent resin, or the like.

The discharge tube 20 is made of a transparent material, for instance, borosilicate glass. Alternatively, the discharge tube 20 may be made of quartz glass, soda-lime glass, or lead glass. The discharge tube 20 may include a dielectric layer (for instance, a resin layer, a titanium oxide layer, or a silicon oxide layer) provided on a surface of the discharge tube 20. For instance, it is possible to use a discharge tube that includes a glass tube, and a multilayer film made of a polyester-based resin that is formed on an outer surface of the glass tube. The glass tube used for forming the discharge tube 20 normally has an outside diameter of approximately 1.2 mm to 15 mm. The glass tube normally has a thickness of approximately 0.2 mm to 1.0 mm. In the case where a dielectric layer is formed on a surface of the glass tube, the dielectric layer normally has a thickness of approximately 0.5 $\mu$m to 100 $\mu$m. It should be noted that the discharge tube 20 does not necessarily have a straight shape, but may have another shape. For instance, it may be formed in a shape of the letter L, in a quadrilateral shape, or in a shape of the letter U.

The discharge tube 20 is sealed, and a discharge medium (not shown) is encapsulated in the discharge tube (this also applies to Embodiments described later). The discharge medium preferably contains at least one type of gas selected from xenon gas, krypton gas, argon gas, neon gas, and helium gas. The discharge medium preferably is composed of a rare gas alone. However, the discharge medium may contain a slight amount of mercury as long as most of the light is emitted from the discharge medium other than mercury. In the case where the discharge medium does not contain mercury, a change in the light emission efficiency caused by a rise of a temperature of mercury does not occur. As the rare gas, normally xenon gas is used. The pressure of the rare gas (for instance, xenon gas) inside the discharge tube 20 preferably is in a range of 2 kPa to 35 kPa. Such a discharge medium is applicable in devices according to Embodiments described later.

As shown in FIGS. 3 and 4, a phosphor layer 23 is formed on an inner surface of the discharge tube 20. The phosphor layer 23 is formed so as to convert a wavelength of light emitted from the discharge medium. By altering materials of the phosphor layer 23, lights with various wavelengths can be obtained. For example, white light, red, green, and blue (RGB) lights, etc. can be obtained. The phosphor layer 23 can be made of a material generally used in a discharge lamp.

Each first electrode 21 is formed inside an end of the discharge tube 20. The first electrode 21 can be made of a metal, for instance, tungsten or nickel. The first electrode 21 is connected with the driving circuit 13 via the wiring pattern 14 or a lead wire 15. The first electrode 21 may be formed outside the discharge tube 20. Further, two first electrodes 21 may be arranged at both ends of the discharge tube 20, respectively. A surface of the first electrode 21 may be covered with a metal oxide layer made of, for instance, cesium oxide, magnesium oxide, barium oxide, etc. The use of such a metal oxide layer allows an illumination start voltage to decrease, thereby preventing the electrode from being degraded by ion impact. Alternatively, the surface of the first electrode 21 may be covered with a dielectric layer (for instance, a glass layer). The use of such a dielectric layer makes it possible to suppress current upon discharge. This suppresses the continuous flow of current upon discharge, thereby stabilizing the discharge. Furthermore, the first electrode 21 may be formed outside the discharge tube 20, as described in Embodiment 2.

In each groove 11g, a plurality of the second electrodes 22 are formed. The second electrodes 22 can be formed by printing a metal paste containing a resin and a metal powder (for instance, silver powder). The second electrodes 22 are in contact with the discharge tube 20 at a plurality of portions that are at different distances from the first electrode 21 and that are arranged discontinuously. Since the second electrodes 22 are in contact with the discharge tube 20 at discontinuous portions, it is possible to prevent the discharge from being constricted in the vicinities of the second electrodes 22. It should be noted that the second electrodes 22 may be in contact with the discharge tube 20 via a dielectric. The "contact of the discharge tube 20 with the second electrodes 22" means that no air space is present therebetween.

The second electrodes 22 are connected with the driving circuit 13 and a ground potential via the metal layer 11m. The metal layer 11m is connected with the wiring pattern 14 via a wire 16 that passes through a through hole 11h formed in the substrate 11. The wire 16 can be formed by filling a metal paste in the through hole 11h. The first electrodes 21 may be connected with the driving circuit 13 via a wire passing through the through hole 11h. In this case, in order to prevent the metal layer 11m and the first electrodes 21 from being in contact with each other, an insulating layer is formed on an inner surface of the through hole 11h or the wires are coated with an insulator. In the case where the electrodes and the driving circuit are connected with each other via a wire passing through the through hole 11h, a shorter wire suffices for use therein, which makes it possible to reduce a stray capacitance resulting from the wire.

When the second electrodes 22 are arranged with uniform distances between adjacent ones, the luminance decreases with decreasing proximity to the first electrode 21 in some cases. Therefore, as shown in FIG. 1, a distance between adjacent second electrodes 22 may be decreased with decreasing proximity to the first electrode 21. In this case, the second electrode 22 may have an increased width with decreasing proximity to the first electrode 21. This configuration makes it possible to obtain uniform light emission more readily.

In the light source device 10, the application of a voltage across the first electrodes 21 and the second electrodes 22 causes discharge, thereby exciting the discharge medium. The discharge medium thus excited emits ultraviolet rays when making a transition to a ground state. The ultraviolet rays are converted into visible light by the phosphor layers 23, and the visible light is radiated from the discharge tubes 20. The light radiated from the discharge tubes 20 is diffused by the diffusing plate 12 so that substantially uniform light output distribution is obtained. Thus, the light source device 10 functions as a planar light source.

Figure 5A:
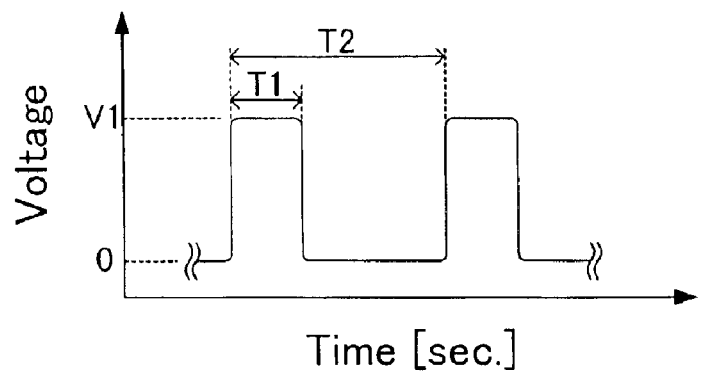
FIG. 5A is a view illustrating an example of a voltage applied across first and second electrodes.
Figure 5B:
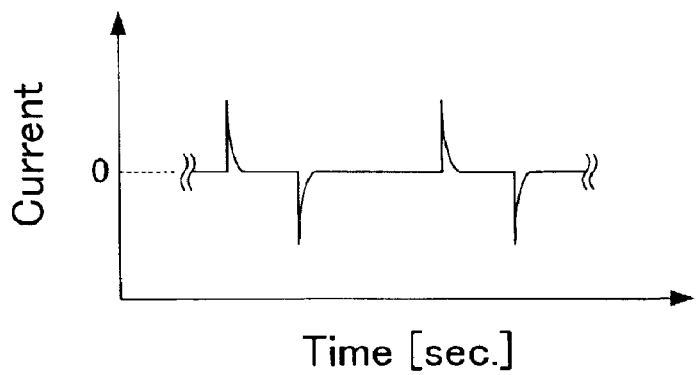
FIG. 5B is a view illustrating an example of a current that flows through the first and second electrodes.

The following will describe an example of a voltage applied across the first and second electrodes 21 and 22. The voltage applied across the first and second electrodes 21 and 22 may have a sinusoidal waveform or a rectangular waveform, and may have a polarity inversion, which however is not a requirement. In the case where mercury is not sealed inside the discharge tube 20, it is preferable that the second electrodes 22 are grounded and a rectangular-waveform voltage that has no polarity inversion is applied to the first electrodes 21. An example of such an applied voltage is shown in FIG. 5A. In the example shown in FIG. 5A, the voltage applied to the first electrode 21 is modulated between 0 V to a positive voltage V1. A ratio of a time T1 for the application of the voltage V1 to a cycle T2 of the rectangular wave (T1/T2) preferably is approximately 0.15 to 0.5. The rectangular wave has a frequency in a range of, for example, 10 kHz to 60 kHz. FIG. 5B illustrates the current that flows through the two electrodes when the voltage shown in FIG. 5A is applied across the same. Current corresponding to a differentiated waveform of the applied voltage flows through the first and second electrodes 21 and 22.

Figure 5C:
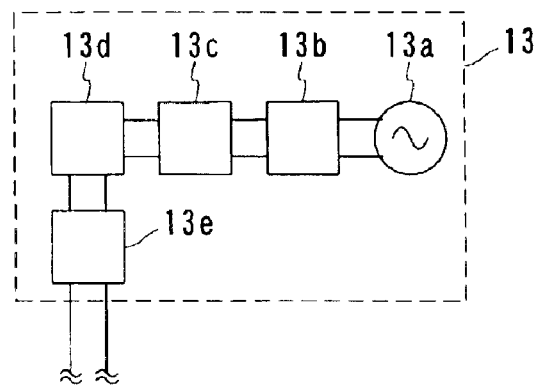
FIG. 5C is a view illustrating an example of a configuration of a driving circuit.

FIG. 5C illustrates an example of a configuration of the driving circuit 13 for applying the voltage as shown in FIG. 5A. The driving circuit 13 includes an AC power supply 13a, a rectifier circuit 13b, a smoothing circuit 13c, a boosting circuit 13d, and a switching circuit 13e. Generally-used circuits can be used as these circuits. An AC voltage generated by the AC power supply 13a is converted into a positive DC voltage by the rectifier circuit 13b. The rectified voltage is smoothed by the smoothing circuit 13c, and is boosted by the boosting circuit 13d. The boosted voltage is applied during a predetermined time T1 by the switching circuit 13e. Thus, a rectangular-waveform voltage is applied.

The light source device 10 can be reduced in size and in thickness, since in the light source device 10, the discharge tubes 20 are arranged on the principal surface 11a of the substrate 11, while the driving circuit 13 is mounted on the other principal surface 11b of the substrate 11. Further, since the substrate 11 includes the metal layer 11m, it is possible to prevent noises generated by the driving circuit 13 and wires from reaching the discharge tubes 20. Furthermore, it is possible to dissipate heat from the discharge tubes 20 and the driving circuit 13 using the substrate 11.

Embodiment 2

Figure 6:
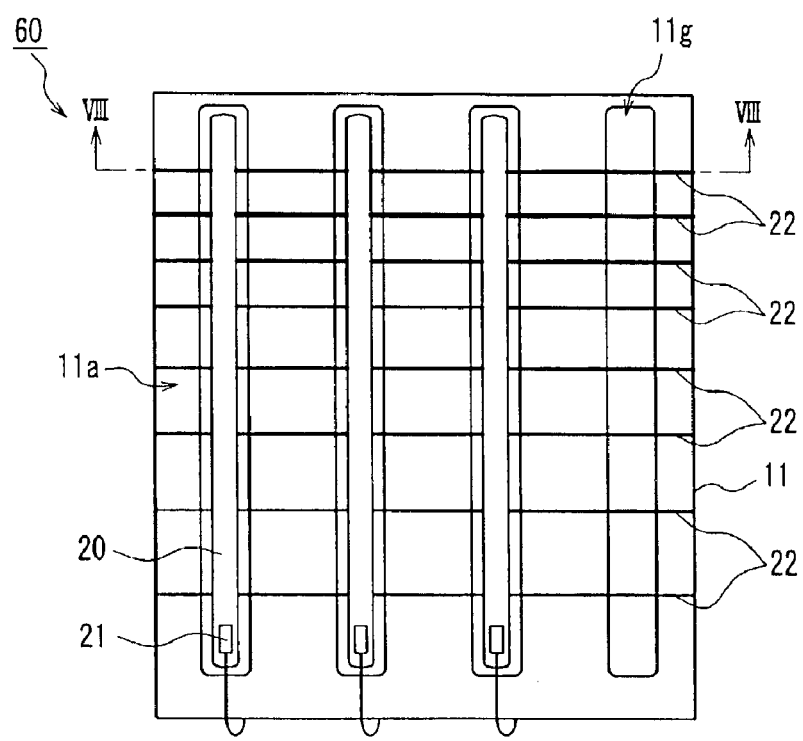
FIG. 6 is a plan view schematically illustrating another example of a configuration of a light source device of the present invention.
Figure 7:
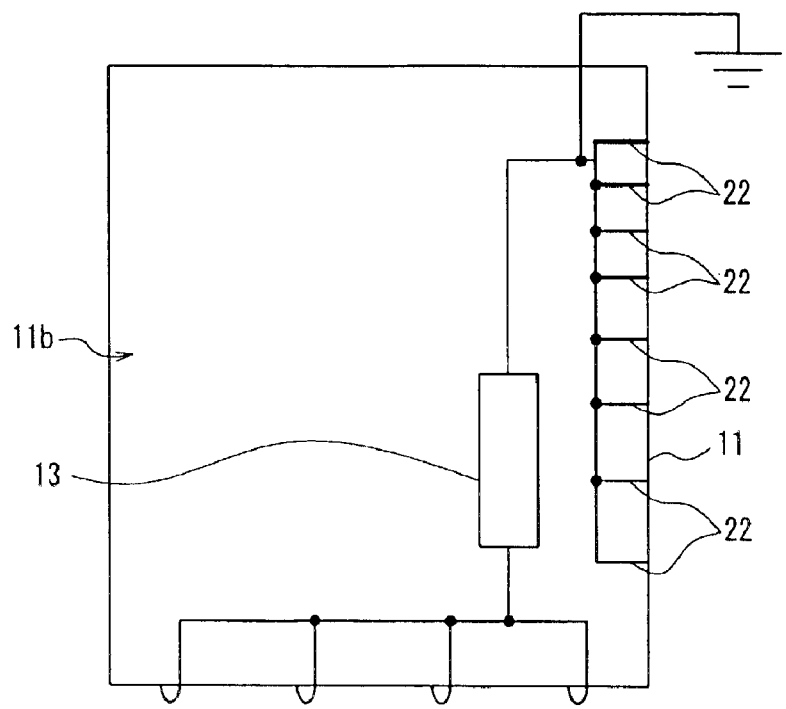
FIG. 7 is a plan view of a back side of the light source device shown in FIG. 6, which schematically illustrates the configuration thereof.
Figure 8:
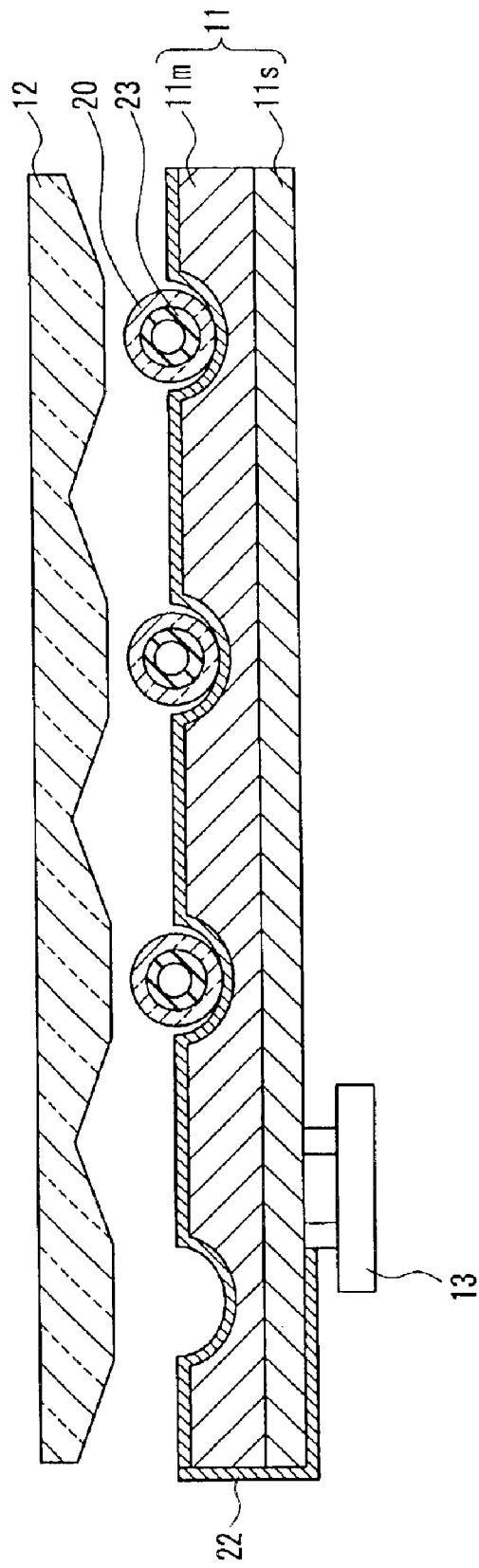
FIG. 8 is a cross-sectional view of the light source device taken along a line VIII—VIII in FIG. 6.

In Embodiment 2, another example of a light source device of the present invention is described. FIG. 6 is a plan view schematically illustrating a configuration of a light source device 60 of Embodiment 2. FIG. 7 is a plan view of a back side of the light source device 60, which schematically illustrates the configuration thereof. FIG. 8 is a cross-sectional view of the same taken along a line VIII—VIII in FIG. 6. The light source device 60 differs from the light source device 10 in the shape of the second electrodes.

The light source device 60 has second electrodes 22, each of which is in a linear form. The second electrodes 22 are formed so as to cross tube axes of the discharge tubes 20 (or axes of grooves 11g) at right angles. The second electrodes 22 are formed, for example, by printing a metal paste (for instance, silver paste). The second electrodes 22 are in contact with the discharge tubes 20 at a plurality of portions that are located at different distances from the first electrodes 21 and that are provided discontinuously.

The second electrodes 22 are extended via a side face of the substrate 11 to the other principal surface 11b side, and are connected with the driving circuit 13. It should be noted that at least one electrode selected from the first and second electrodes 21 and 22 may be connected with the driving circuit via wires passing through holes (this also applies to Embodiments described later).

All the parts except for the second electrodes 22 may be the same as those of the light source device 10. However, in the light source device 60, since it is possible to connect the second electrodes 22 with the driving circuit 13 directly, without the substrate 11 being interposed therebetween, the metal layer 11m does not have to be provided on the principal surface 11a side of the substrate 11. However, in such a case, it is still preferable that the substrate 11 includes a metal layer so as to suppress the influences of noises of the driving circuit.

Embodiment 3

Figure 9:
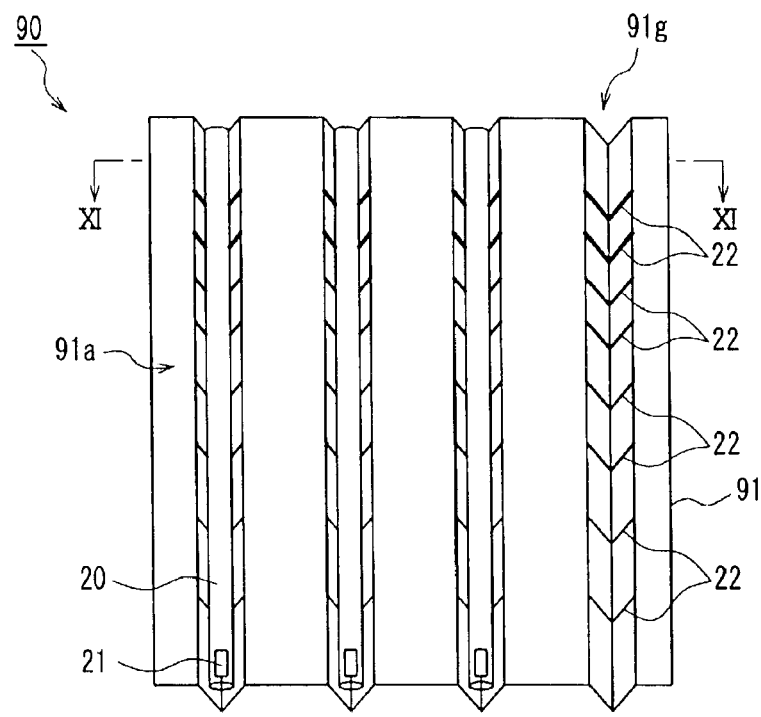
FIG. 9 is a perspective view schematically illustrating still another example of a configuration of a light source of the present invention.
Figure 10:
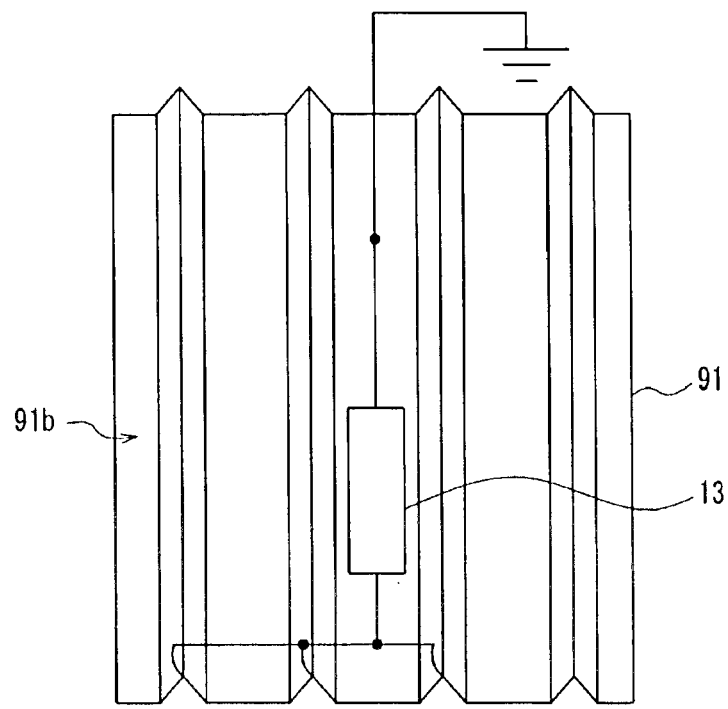
FIG. 10 is a perspective view of a back side of the light source device shown in FIG. 9, which schematically illustrates the configuration thereof.
Figure 11:
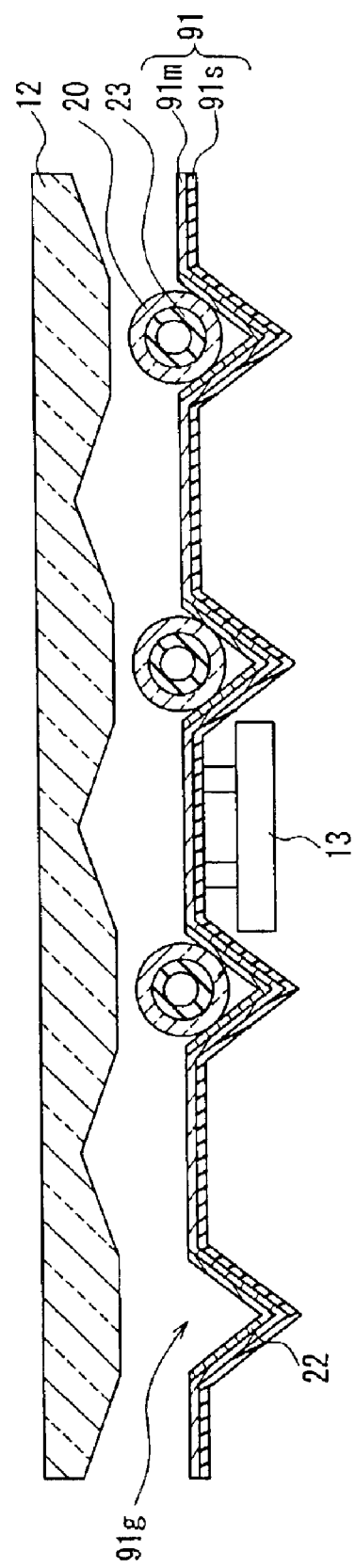
FIG. 11 is a cross-sectional view of the light source device taken along a line XI—XI in FIG. 9.

In Embodiment 3, another example of a light source device of the present invention is described. FIG. 9 is a perspective view schematically illustrating a configuration of a light source device 90 of Embodiment 3. FIG. 10 is a perspective view of a back side of the light source device 90, which schematically illustrates the configuration of the back side thereof. FIG. 11 is a cross-sectional view of the same taken along a line XI—XI in FIG. 9. It should be noted that in FIGS. 9 and 10, the illustration of a diffusing plate is omitted.

Comparing the light source device 90 with the light source device 10, only the substrates thereof are different from each other. The light source device 90 has a substrate 91 in place of the substrate 11. On a principal surface 91a of the substrate 91, grooves 91g are formed. While each groove 11g of the substrate 11 of the light source device 10 has a U-shaped cross section, each groove 91g of the substrate 91 of the light source device 90 has a V-shaped cross section. The grooves 91g of the substrate 91 can be formed by bending the substrate 91.

The substrate 91 can be made of the same materials as those for the substrate 11. For instance, a metal plate (for example, an aluminum plate) on one of whose principal surfaces an insulating layer is formed can be used. The insulating layer can be formed using an epoxy resin, a glass-epoxy mixture resin, or ceramics (alumina, for example), etc. FIG. 9 illustrates a substrate composed of a metal plate 91m and an insulating layer 91s.

In the light source device 90, the driving circuit 13 is mounted on the other principal surface 91b of the substrate 91 at a position where the grooves 91g are not formed. This configuration makes it possible to provide a particularly thin light source device.

Embodiment 4

Figure 12:
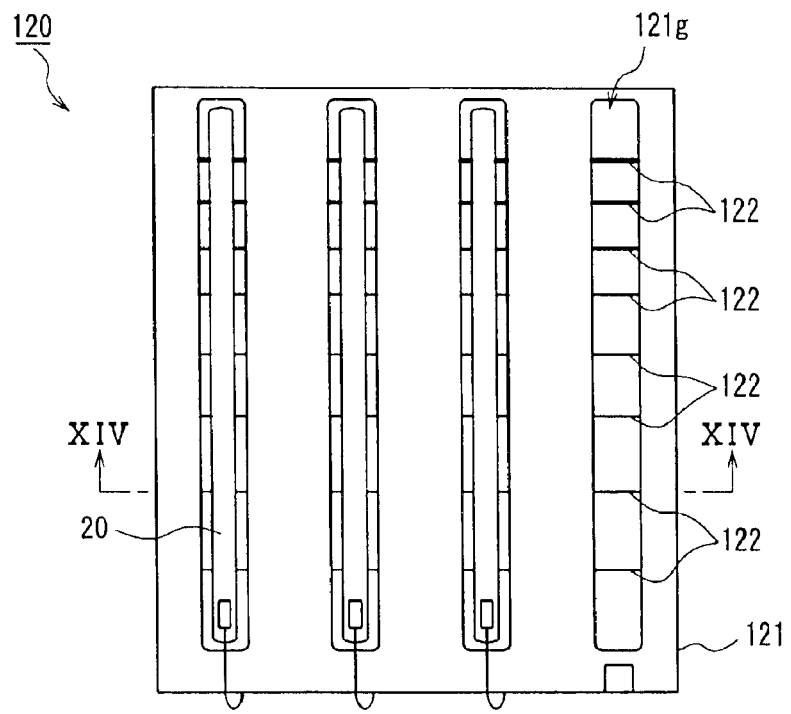
FIG. 12 is a plan view schematically illustrating still another example of a configuration of a light source device of the present invention.
Figure 13:
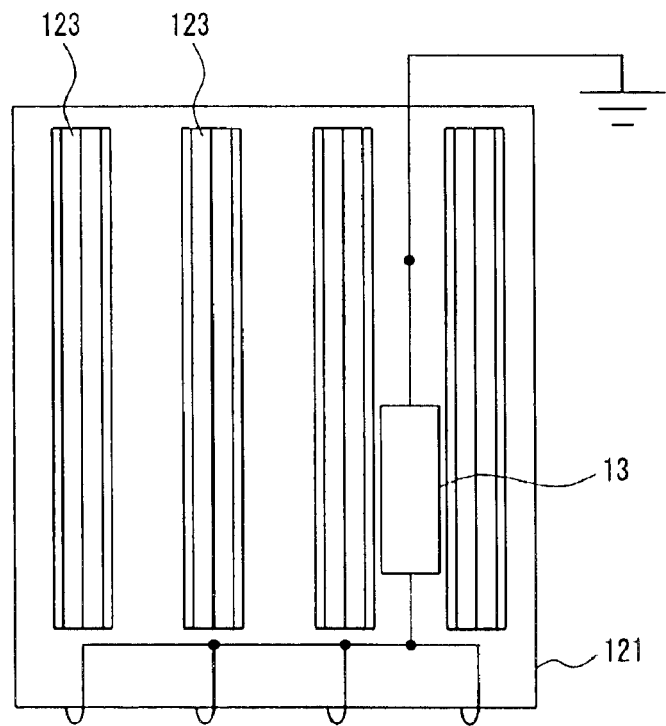
FIG. 13 is a plan view of a back side of the light source device shown in FIG. 12, which schematically illustrates the configuration thereof.
Figure 14:
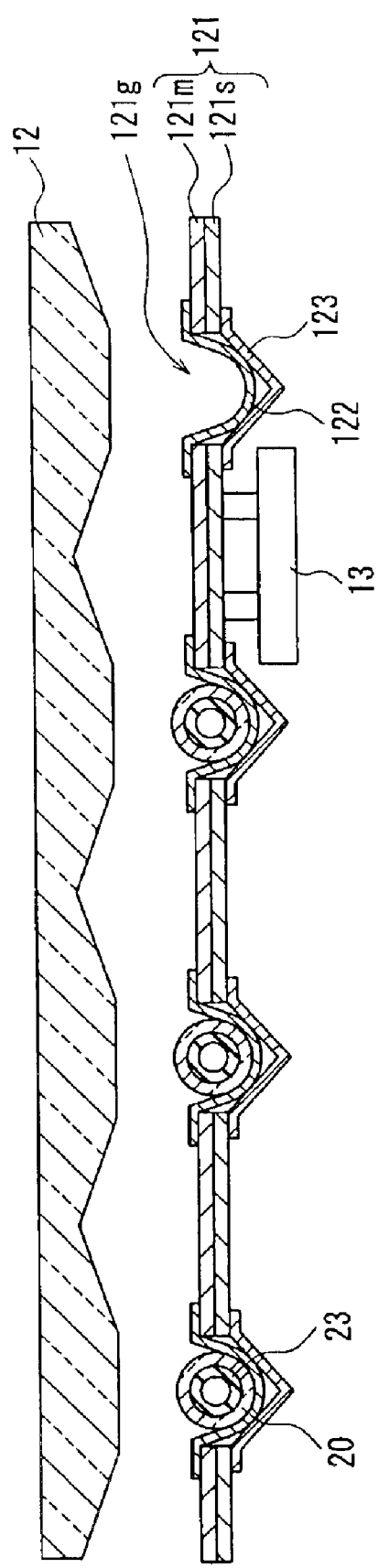
FIG. 14 is a cross-sectional view of the light source device taken along a line XIV—XIV in FIG. 12.

In Embodiment 4, still another example of a light source device of the present invention is described. FIG. 12 is a plan view schematically illustrating a configuration of a light source device 120 of Embodiment 4. FIG. 13 is a plan view of a back side of the light source device 120, which schematically illustrates the configuration thereof. FIG. 14 is a cross-sectional view of the light source device 120 taken along a line XIV—XIV in FIG. 12.

Comparing the light source device 120 with the light source device 10, only the substrates thereof and the shapes of the second electrodes are different from each other. The light source device 120 includes a substrate 121 in place of the substrate 11.

A plurality of holes 121g are provided in the substrate 121. In the holes 121g, a plurality of second electrodes 122 are arranged. On the back side of the substrate 121, reflecting plates 123 are arranged at the holes 121g. Thus, the holes 121g and the reflecting plates 123 form grooves in which the discharge tubes 20 are arranged.

The substrate 121 can be made of the same materials as those for the substrate 11. The second electrodes 122 can be made of a conductive metal (for instance, aluminum). The reflecting plates 123 can be made of a metal such as aluminum.

The driving circuit 13 is mounted on the back side of the substrate 121, at a position where the reflecting plates 123 are not provided. This configuration makes it possible to provide a particularly thin light source device.

Embodiment 5

In Embodiment 5, still another example of a light source device of the present invention is described. A light source device of Embodiment 5 is a light source device applicable in a field-sequential display device.

Figure 15:
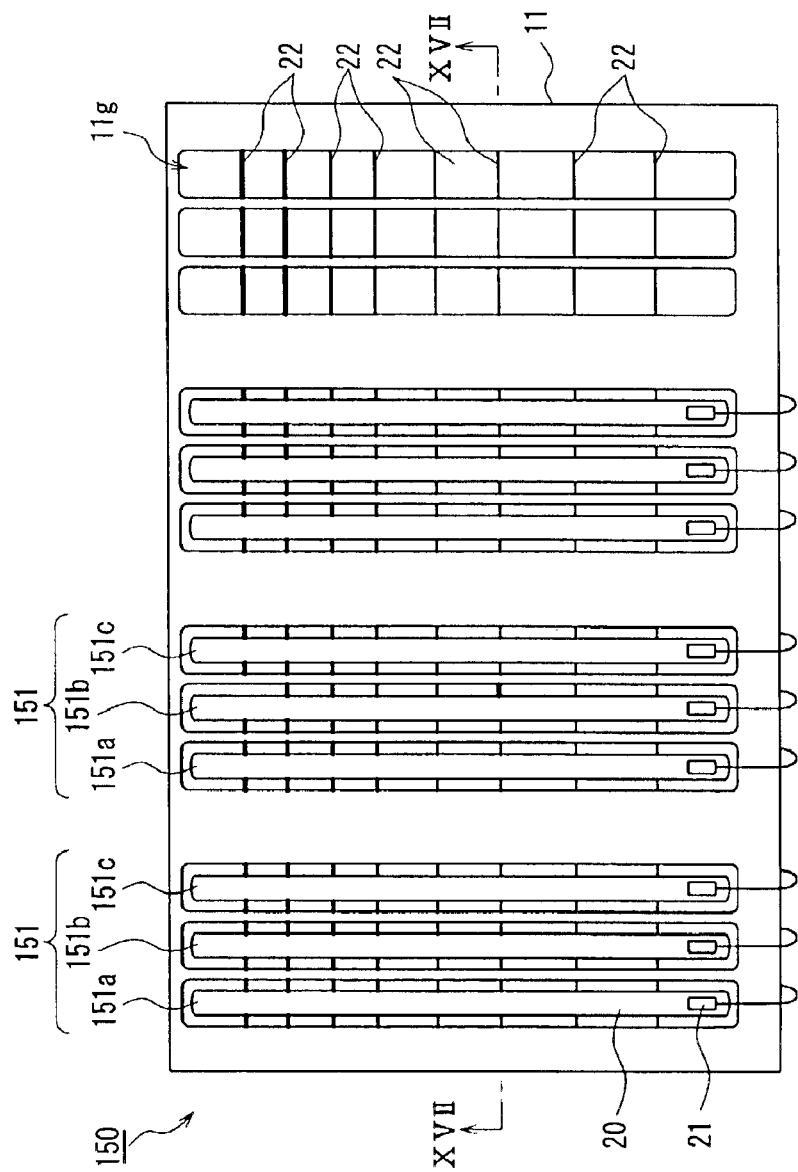
FIG. 15 is a plan view schematically illustrating still another example of a configuration of a light source of the present invention.
Figure 16:
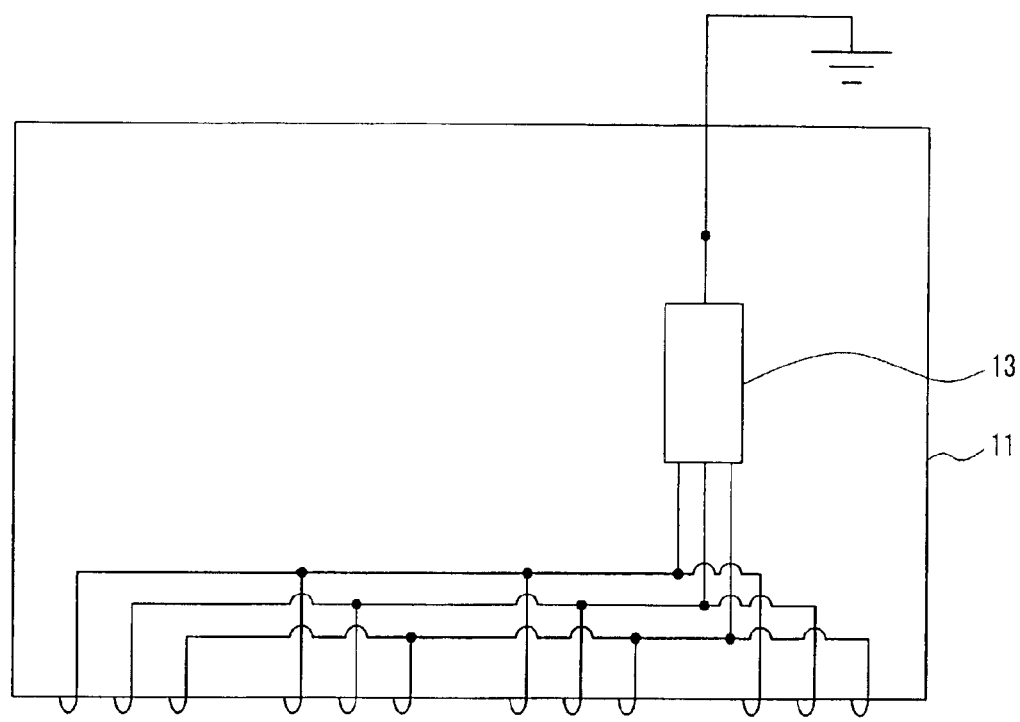
FIG. 16 is a plan view of a back side of the light source device shown in FIG. 15, which schematically illustrates the configuration thereof.
Figure 17:
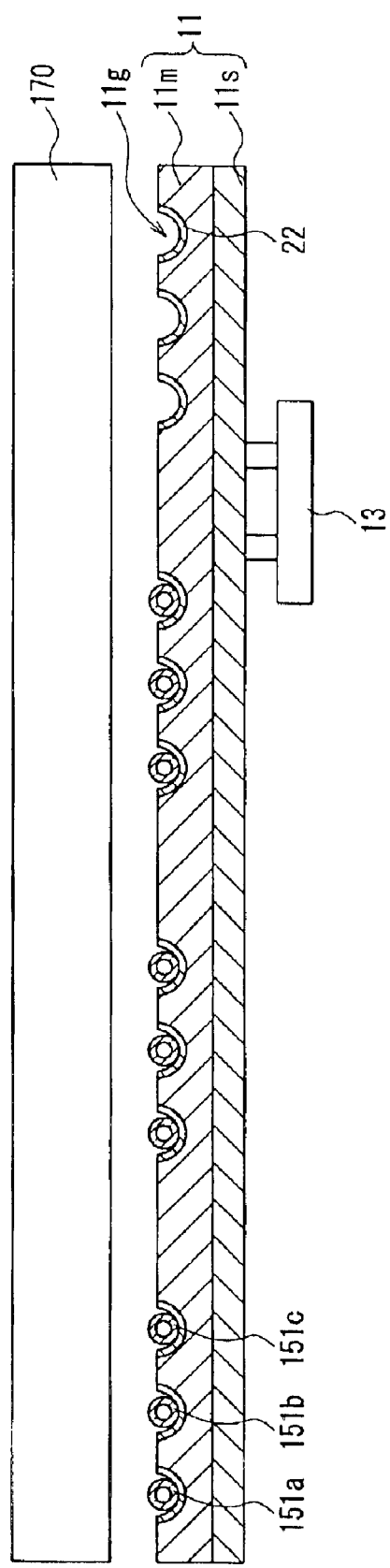
FIG. 17 is a cross-sectional view of the light source device taken along a line XVII—XVII in FIG. 15.

FIG. 15 is a plan view schematically illustrating a configuration of a light source device 150 of Embodiment 5. FIG. 16 is a plan view of a back side of the light source device 150, which schematically illustrates the configuration thereof. FIG. 17 is a cross-sectional view of the light source device 150 taken along a line XVII—XVII in FIG. 15. It should be noted that in FIG. 17, a liquid crystal panel is illustrated also.

In the light source device 150, a plurality of groups 151 are provided, each of which is composed of three types of discharge tubes, namely, discharge tubes 151a, 151b, and 151c. The discharge tubes 151a, 151b, and 151c are arranged in the stated order repetitively. The discharge tubes 151a, 151b, and 151c emit lights with wavelengths different from one another. In other words, the discharge tubes have layers of phosphors corresponding to the lights to be emitted. The phosphor layers can be made of known phosphors. More specifically, the discharge tubes 151a, 151b, and 151c may be those which emit red, green, and blue lights, respectively. Alternatively, the discharge tubes 151a, 151b, and 151c may be those which emit cyan, magenta, and yellow lights, respectively. By turning on these discharge tubes 151a, 151b, and 151c at the same time, white light is obtained.

In a field-sequential display device, a liquid crystal panel 170 is arranged above the light source device 150. A liquid crystal panel identical to that for use in a monochromatic liquid crystal display device is applicable as the foregoing liquid crystal panel. For displaying an image, the discharge tubes 151a, 151b, and 151c are turned on/off sequentially at a high speed. Consequently, lights of, for instance, red, green, and blue colors are emitted sequentially. At each pixel in the liquid crystal panel, the liquid crystal is actuated so as to control an open time (time during which light is transmitted). For instance, at a pixel to display yellow color, an open time for emitting red light and an open time for emitting green light may be set equal, with an open time for emitting blue light being set null. In such a case, the red light and the green light thus emitted are synthesized by persistence of vision, and are perceived as yellow by a human. In such a field-sequential display device, color filters for a liquid crystal panel are unnecessary. Therefore, it is possible to reduce each pixel in size, thereby making it possible to achieve the high-definition image display. Furthermore, in the case where the pixel size is unchanged, loss of light due to the color filters is eliminated, whereby an increase in the light utilization efficiency can be achieved.

It should be noted that each of the light source devices described in Embodiments 1 to 4 may include a liquid crystal panel. Furthermore, the light source device of the present invention may include a diffusing plate that is arranged between the liquid crystal panel and the discharge tubes.

As described above, the present invention makes it possible to provide a light source device that can be formed smaller in size and thinner in thickness. Furthermore, by using this light source device, it is possible to obtain a liquid crystal display device that can be formed smaller in size and thinner in thickness.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A light source device, comprising:

a substrate having a first principal surface and a second principal surface that are on opposite sides of the substrate;

a plurality of discharge tubes arranged on the first principal surface of the substrate;

a driving circuit mounted on the second principal surface of the substrate;

a discharge medium sealed in the discharge tubes; and first and second electrodes for exciting the discharge medium.

wherein the substrate includes a metal layer provided on a side of the first principal surface, and an insulating layer provided on a side of the second principal surface, and wherein each of the first electrodes is arranged inside each of the discharge tubes, and the second electrodes are formed on the substrate.

2. The light source device according to claim 1, wherein the discharge medium does not contain mercury.

3. The light source device according to claim 1, wherein a plurality of grooves are formed on the first principal surface side of the substrate, and the discharge tubes are arranged in the grooves.

4. The light source device according to claim 1, wherein the plurality of discharge tubes are arranged so that tube axes thereof are arranged in parallel, the second electrodes include a plurality of linear electrodes that are arranged in stripes, and the linear electrodes are arranged so as to be perpendicular to the tube axes of the discharge tubes.

5. The light source device according to claim 1, wherein a through hole is formed in the substrate, and at least one electrode selected from the first and second electrodes is connected electrically with the driving circuit via a wire passing through the through hole.

6. The light source device according to claim 1, wherein the discharge medium contains xenon gas.

7. The light source device according to claim 1, wherein the discharge tubes comprise a plurality of first discharge tubes, a plurality of second discharge tubes, and a plurality of third discharge tubes, the first, second, and third discharge tubes are arranged in the stated order repetitively, and the first, second, and third discharge tubes emit lights with wavelengths different from one another, respectively.

8. A liquid crystal display comprising a light source device, and a liquid crystal panel that transmits light emitted from the light source device, wherein the light source device includes:

a substrate having a first principal surface and a second principal surface that are on opposite sides of the substrate;

a plurality of discharge tubes arranged on the first principal surface of the substrate;

a driving circuit mounted on the second principal surface of the substrate;

a discharge medium sealed in the discharge tubes; and first and second electrodes for exciting the discharge medium.

wherein the substrate includes a metal layer provided on a side of the first principal surface, and an insulating layer provided on a side of the second principal surface, and wherein each of the first electrodes is arranged inside each of the discharge tubes, and the second electrodes are formed on the substrate.

9. The liquid crystal display according to claim 8, wherein the discharge medium does not contain mercury.

10. The liquid crystal display according to claim 8, wherein a plurality of grooves are formed on the first principal surface side of the substrate, and the discharge tubes are arranged in the grooves.

11. The liquid crystal display according to claim 8, wherein the plurality of discharge tubes are arranged so that tube axes thereof are arranged in parallel, the second electrodes include a plurality of linear electrodes that are arranged in stripes, and the linear electrodes are arranged so as to be perpendicular to the tube axes of the discharge tubes.

12. The liquid crystal display according to claim 8, wherein a through hole is formed in the substrate, and at least one electrode selected from the first and second electrodes is connected electrically with the driving circuit via a wire passing through the through hole.

13. The liquid crystal display according to claim 8, wherein the discharge medium contains xenon gas.

14. The liquid crystal display according to claim 8, wherein the discharge tubes comprise a plurality of first discharge tubes, a plurality of second discharge tubes, and a plurality of third discharge tubes, the first, second, and third discharge tubes are arranged in the stated order repetitively, and the first, second, and third discharge tubes emit lights with wavelengths different from each other, respectively.

* * * * *

UNITED STATES PATENT AND TRADEMARK OFFICE
CERTIFICATE OF CORRECTION

PATENT NO. : 6,891,334 B2
DATED : May 10, 2005
INVENTOR(S) : Yamamoto et al.

Page 1 of 1

It is certified that error appears in the above-identified patent and that said Letters Patent is hereby corrected as shown below:

<u>Column 9,</u>
Line 12, "medium." should read -- medium, --.
Line 24, "on the first principal" should read -- on the side of the first principal --.
Line 25, "surface side of substrate" should read -- surface of the substrate --.

<u>Column 10,</u>
Line 10, "medium." should read -- medium, --.
Line 21, "on the first principal" should read -- on the side of the first --.
Line 22, "surface side of the substrate" should read -- surface of the substrate --.

Signed and Sealed this

Twenty-eighth Day of March, 2006

JON W. DUDAS
*Director of the United States Patent and Trademark Office*